United States Patent [19]

Tsay

[11] Patent Number: 5,401,000
[45] Date of Patent: Mar. 28, 1995

[54] STRUCTURE OF A QUICK CONNECTOR

[76] Inventor: Fwu Tsay, 120-1, Lane 734, Sec. 3, Sha Tyan Road, Dah Du Hsiang, Taichung, Taiwan, Prov. of China

[21] Appl. No.: 177,367
[22] Filed: Jan. 5, 1994
[51] Int. Cl.⁶ .............................................. F16L 37/28
[52] U.S. Cl. ................................................... 251/149.6
[58] Field of Search .......................... 251/149.1, 149.6; 285/314, 315, 316, 317

[56] References Cited

U.S. PATENT DOCUMENTS

| | | | |
|---|---|---|---|
| 4,638,975 | 1/1987 | Iuchi et al. | 251/149.6 |
| 4,848,728 | 7/1989 | Ekman | 251/149.6 |
| 5,167,398 | 12/1992 | Wade et al. | 251/149.6 |

Primary Examiner—Martin P. Schwadron
Assistant Examiner—Kevin L. Lee
Attorney, Agent, or Firm—Beveridge, DeGrandi, Weilacher & Young

[57] ABSTRACT

A quick connector including a pipe connector at one end and a connecting tube at an opposite end, a slide valve received inside the connecting tube and supported on a conical spring to block up the air passage way through the connecting tube, wherein when a matching male connector is inserted into the connecting tube, the slide valve is moved backwards to open the air passage way permitting a gas to pass from the pipe connector out of the connecting tube through the slide valve.

18 Claims, 3 Drawing Sheets

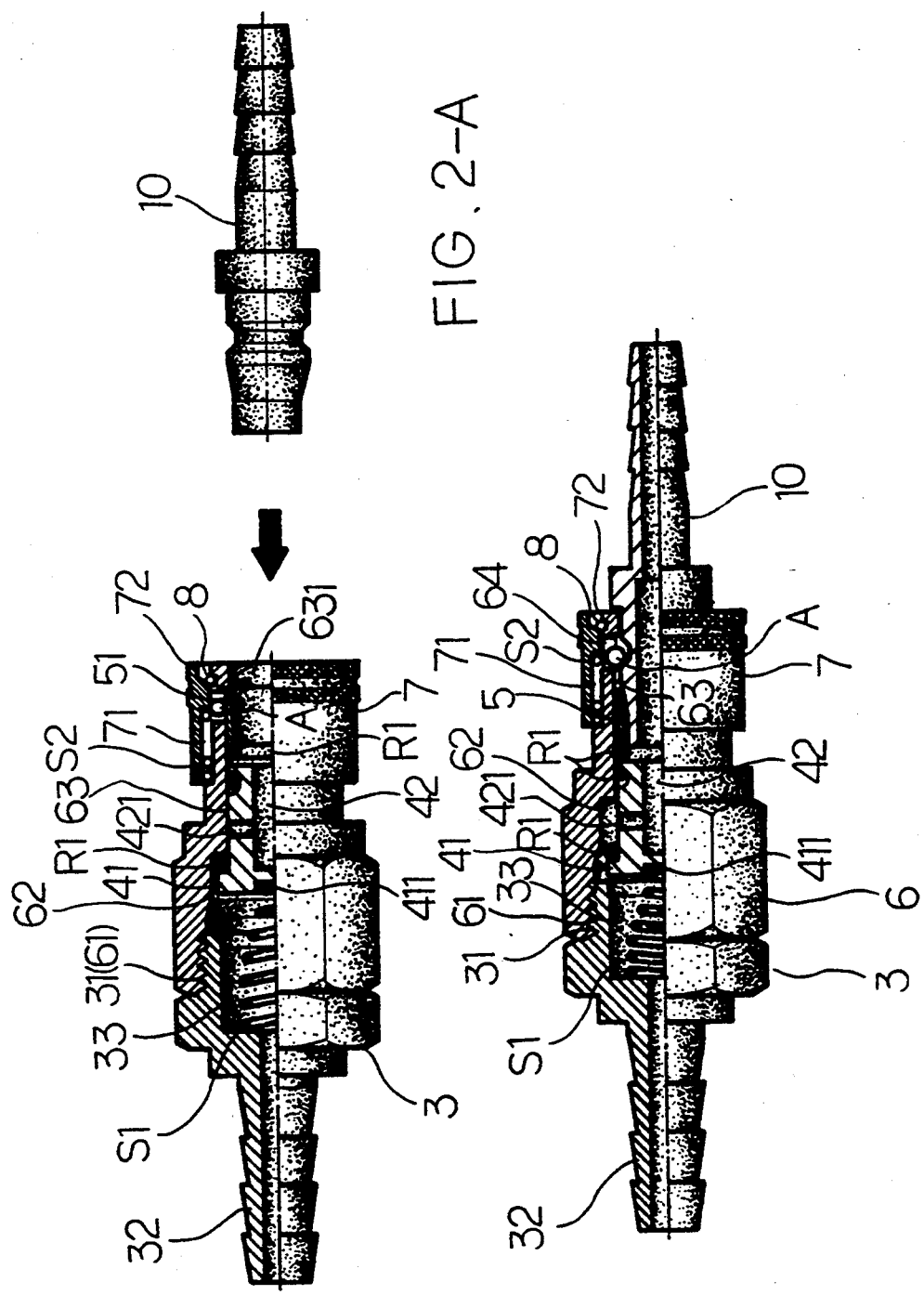
FIG. 2-A
FIG. 2-B

STRUCTURE OF A QUICK CONNECTOR

BACKGROUND OF THE INVENTION

The present invention relates to a quick connector for use in an air piping system to join two pipe sections together.

FIG. 1 shows a quick connector for use in a piping system according to the prior art, which is generally comprised of an inlet connector 11, an outlet connector 12, a socket 13 connected between the inlet connector 11 and the outlet connector 12, a locating ring 14 mounted with a seal ring R1 and disposed within the socket 13 and retained in place by steel balls A, a bolt holder 16 disposed inside the socket 13 and sealed by the seal ring R3, a hollow bolt 15 inserted through a bolt holder 16 and supported on a spring S2 and sealed by the seal ring R3. When the matched male connector 2 is inserted into the outlet connector 12, the hollow bolt 15 is pushed backwards to move the seal ring R3 away from the bolt holder 16, and therefore a flow of gas (or liquid) F is allowed to pass through the quick connector. Because most parts of the quick connector are made of metal, the cost of the quick connector is expensive, and the quick connector is not suitable for use in water piping systems (the metal parts of the quick connector will rust away quickly). Another drawback of this structure of quick connector is its complicated assembly procedure. Furthermore, because the seal rings are mounted on metal parts, they may be damaged easily.

SUMMARY OF THE INVENTION

The present invention eliminates the aforesaid drawbacks. It is one object of the present invention to provide a quick connector which is suitable for use in air piping systems as well as liquid piping systems. It is another object of the present invention to provide a quick connector which is easy to assemble. It is still another object of the present invention to provide a quick connector which is durable in use. It is still another object of the present invention to provide a quick connector which is inexpensive to manufacture.

According to the preferred embodiment of the present invention, the quick connector comprises a pipe connector at one end, a connecting tube at an opposite end, a slide valve received inside the connecting tube and supported on a conical spring to block up the air passage way through the connecting tube, wherein when a matching male connector is inserted into the connecting tube, the slide valve is moved backwards to open the air passage way permitting a gas to pass from the pipe connector out of the connecting tube through the slide valve. The pipe connector, the connecting tube, the slide valve, and the locating ring are respectively molded from plastics, therefore the manufacturing cost of the quick connector is less expensive,

BRIEF DESCRIPTION OF THE DRAWINGS

FIG. 2A is a cutaway of the quick connector of FIG. 2 (before connection); and

FIG. 2B is a cutaway of the quick connector of FIG. 2 (after connection).

DETAILED DESCRIPTION OF THE PREFERRED EMBODIMENT

Figure 1:
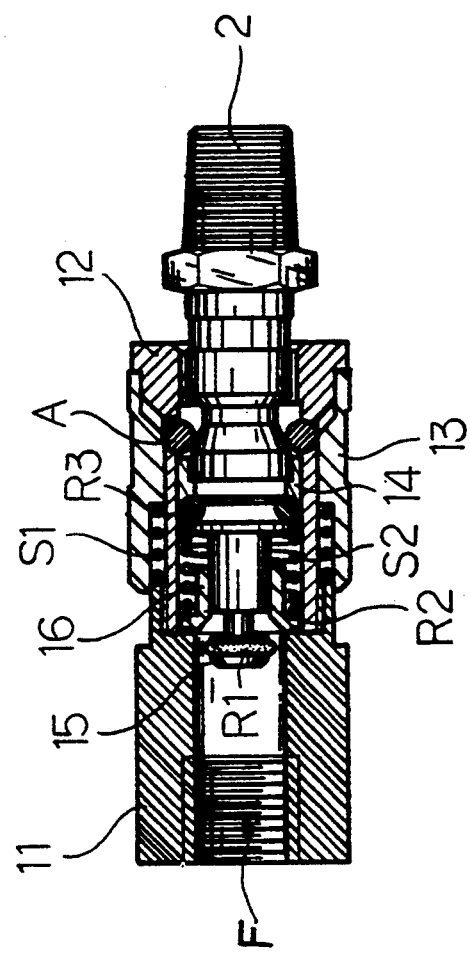
FIG. 1 is a longitudinal view in section of a quick connector according to the prior art.
Figure 2:
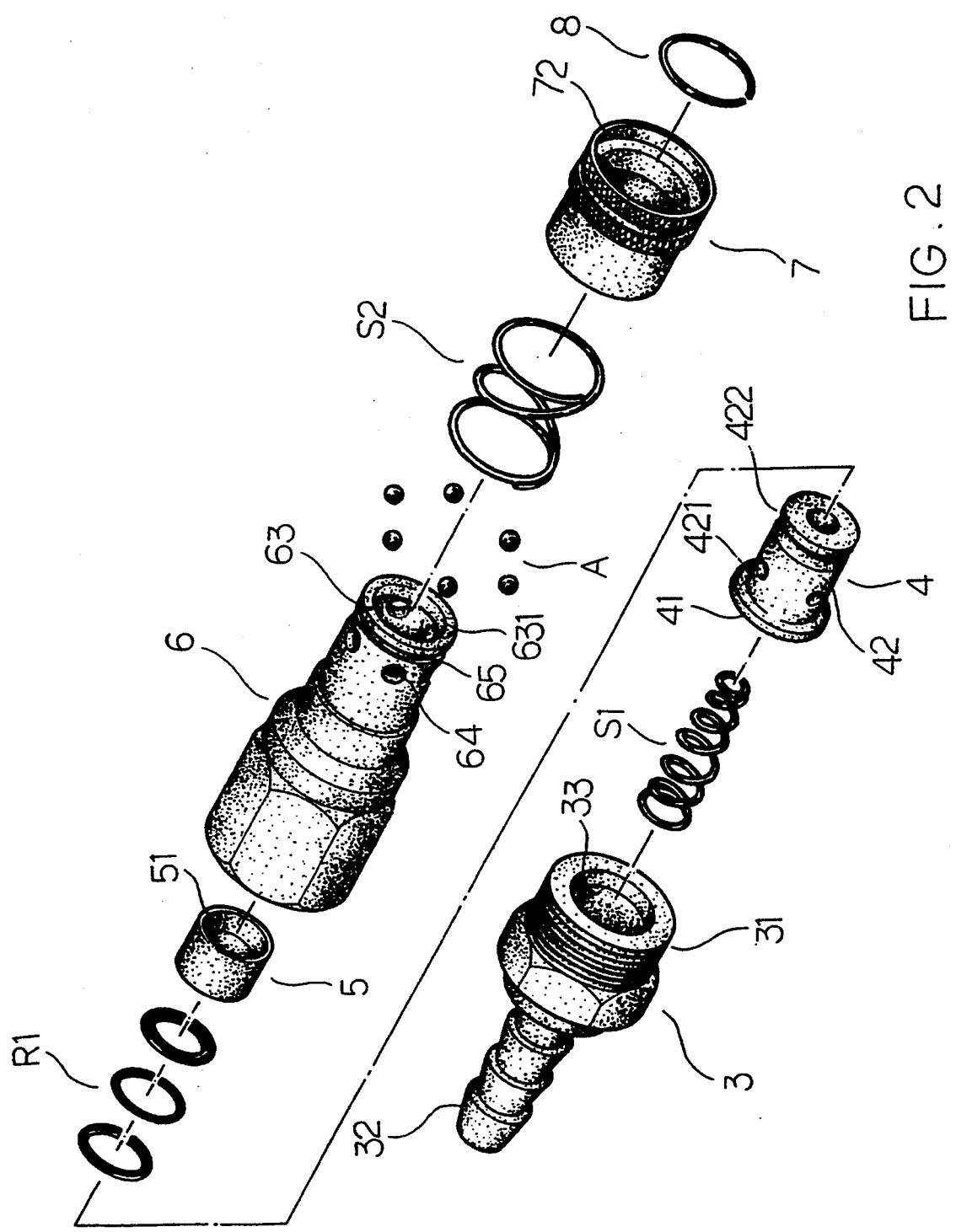
FIG. 2 is all exploded view of a quick connector according to the preferred embodiment of the present invention.

Referring to FIGS. 2 and 2A, a quick connector in accordance with the present invention is a pipe connector 3, a conical spring S1, a slide valve 4, seal rings R1, a locating ring 5, a connecting tube 6, steel balls A, a coil spring S2, a socket 7, and a clamp 8. The pipe connector 3, the slide valve 4, the locating ring 5, the connecting tube 6, and the socket 7 are respectively molded from plastics.

The pipe connector 3 comprises an outer thread 31 at one end, an elongated coupling portion 32 at an opposite end (the coupling portion 32 has a stepped outside wall sloping in the same direction), a chamfered receiving hole 33 within the outer thread 31. The slide valve 4 comprises a hollow valve body 42 having an outward flange 41 around one end thereof, an end notch 411 surrounded by the outward flange 41, an annular groove 422 around an opposite end thereof, and a plurality of through holes 421 arranged in the radial direction around a circle between the outward flange 41 and the annular groove 422. The locating ring 5 has a tapered inside wall 51. The connecting tube 6 comprises an inner thread 61 at one end, an outlet chamber 63 at an opposite end, an intake chamber 62 disposed between the inner thread 61 and the outlet chamber 63, an inside flange 631 around the outlet chamber 63 at an outer end, a plurality of through holes 64 around the outlet chamber 63, which receive the steel balls A respectively, and an outside annular groove 65 around the outlet chamber 63 at an outer side by the through holes 64. The socket 7 comprises a spring chamber 71 and a steel ball race 72 longitudinally aligned on the inside.

Referring to FIGS. 2A again, the locating ring 5 is inserted into the outlet chamber 63 of the connecting tube 6 and stopped at the inside flange 631, then a seal ring R1 is inserted into the connecting tube 6 and stopped at the opposite end of the locating ring 5; the conical spring S1 is connected to the end notch 411 on the slide valve 4 and received in the receiving hole 33 inside the pipe connector 3; the slide valve 4 is received in the outlet chamber 63 of the connecting tube 6 and inserted into the locating ring 5 with the outward flange 41 thereof stopped outside the locating ring 5, and seal rings R1 are then mounted on the annular groove 422 of the slide valve; the socket 7 is mounted on the connecting tube 6 permitting the steel ball A to be received within the steel ball race 72; the pipe connector 3 is connected to the connecting tube 6 by threading the outer thread 31 into the inner thread 61 on the connecting tube 6; the coil spring S2 is received within the spring chamber 71 of the socket 7 and mounted around the outlet chamber 63 of the connecting tube 6 on the outside, a clamp 8 is mounted around the outside annular flange 65 on the connecting tube 6 to hold the coil spring S2 in place.

Referring to FIG. 2B and FIG. 2A again, under normal condition, outward flange 41 of the slide valve 4 is forced by the conical spring S1 to seal the gap between the inlet chamber 62 and the outlet chamber 63 causing the through holes 421 to be sealed by the peripheral wall of the outlet chamber 63, and at the same time, the steel balls A are held within race 72 of the socket and stopped against the locating ring 5 causing the locating ring 5 to be retained in place; when the matched male connector 10 is inserted into the outlet chamber 63, the slide valve 4 to be is moved backwards, causing the outward flange 41 of the slide valve 4 moved away from the gap between the inlet chamber 62 and the outlet chamber 63 permitting a gas to pass from the inlet chamber 62 through the through holes 421 into the outlet chamber 63.

What is claimed is:

1. A quick connector comprising:
   a pipe connector having a coupling portion at one end, wherein the pipe connector is connectable to a pipe segment of a piping system, and a receiving chamber at an opposite end in communication with the pipe segment of said piping system;
   a conical spring received in said receiving chamber of said pipe connector;
   a connecting tube connected to said pipe connector to hold said conical spring on the inside, said connecting tube having an outlet chamber at one end, an inlet chamber at an opposite end, and a plurality of steel balls received in respective through holes defined around said outlet chamber;
   a locating ring received within said outlet chamber and retained in place by said steel balls, wherein said locating ring has a tapered inside wall;
   a socket mounted around said outlet chamber and supported on a coiled spring to hold said steel balls in place; and
   a slide valve received inside said connecting tube between said inlet and outlet chambers, said slide valve having a valve body inserted into said locating ring, an outward flange around a blocked rear end thereof disposed outside said locating ring between said inlet and outlet chambers to block said inlet chamber from said outlet chamber, and holes defined around said valve body;
   wherein when a matching male connector is inserted into said outlet chamber of said connecting tube, said slide valve is moved backwards to release the outward flange thereof away from said outlet chamber, permitting a gas or liquid to pass from said pipe connector and said inlet chamber through the through holes on said slide valve into said matching male connector via said outlet chamber.

2. A quick connector as defined in claim 1, wherein said pipe connector is made from a plastic material.

3. A quick connector as defined in claim 1, wherein said connecting tube is made from a plastic material.

4. A quick connector as defined in claim 1, wherein said slide valve is made from a plastic material.

5. A quick connector as defined in claim 1, wherein said locating ring is made from a plastic material.

6. A quick connector as defined in claim 1, wherein said socket is made from a plastic material.

7. A quick connector as defined in claim 2, wherein said connecting tube is made from a plastic material.

8. A quick connector as defined in claim 2, wherein said slide valve is made from a plastic material.

9. A quick connector as defined in claim 2, wherein said locating ring is made from a plastic material.

10. A quick connector as defined in claim 2, wherein said socket is made from a plastic material.

11. A quick connector as defined in claim 7, wherein said slide valve is made from a plastic material.

12. A quick connector as defined in claim 7, wherein said locating ring is made from a plastic material.

13. A quick connector as defined in claim 7, wherein said socket is made from a plastic material.

14. A quick connector as defined in claim 11, wherein said locating ring is made from a plastic material.

15. A quick connector as defined in claim 11, wherein said socket is made from a plastic material.

16. A quick connector as defined in claim 14, wherein said socket is made from a plastic material.

17. A quick connector as defined in claim 1, wherein said pipe connector is connected to said connecting tube by threads.

18. A quick connector as defined in claim 1, wherein said locating ring has a smooth outer wall.

* * * * *